US010262265B2

United States Patent
Lu

(10) Patent No.: US 10,262,265 B2
(45) Date of Patent: Apr. 16, 2019

(54) SYSTEMS AND METHODS FOR GENERATING AND COMMUNICATING APPLICATION RECOMMENDATIONS AT UNINSTALL TIME

(71) Applicant: Google Inc., Mountain View, CA (US)

(72) Inventor: Hao Lu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/604,647

(22) Filed: May 24, 2017

(65) Prior Publication Data

US 2018/0341865 A1   Nov. 29, 2018

(51) Int. Cl.
*G06F 9/445* (2018.01)
*G06N 5/02* (2006.01)
*G06F 8/61* (2018.01)
*G06Q 30/06* (2012.01)

(52) U.S. Cl.
CPC .............. *G06N 5/022* (2013.01); *G06F 8/61* (2013.01); *G06F 8/62* (2013.01); *G06Q 30/0631* (2013.01)

(58) Field of Classification Search
CPC ........................................ G06F 8/61
USPC ........................................ 717/174
See application file for complete search history.

(56) References Cited

U.S. PATENT DOCUMENTS

| 8,516,308 | B1 | 8/2013 | Gill et al. |
| 8,560,489 | B2 | 10/2013 | Kaufman |
| 8,914,399 | B1 | 12/2014 | Paleja et al. |
| 9,021,429 | B1 | 4/2015 | Agrawal et al. |
| 9,063,811 | B2 | 6/2015 | Stekkelpak et al. |
| 9,098,370 | B2 * | 8/2015 | MacDonald .............. G06F 8/62 |
| 9,223,831 | B2 | 12/2015 | Baker et al. |

(Continued)

FOREIGN PATENT DOCUMENTS

WO    WO-2016099447 A1    6/2016

OTHER PUBLICATIONS

Linden, Greg, et al. "Amazon.com Recommendations Item-to-Item Collaborative Filtering." UMD.edu, Jan. 2003, www.cs.umd.edu/-samir/498/Amazon-Recommendations.pdf. Accessed Jan. 4, 2018. 5 pp.

(Continued)

*Primary Examiner* — Wei Y Zhen
*Assistant Examiner* — Lanny N Ung
(74) *Attorney, Agent, or Firm* — Shumaker & Sieffert, P.A.

(57) ABSTRACT

A method for generating an application recommendation includes receiving a signal from an electronic device indicating that uninstallation of a first application has been initiated by a user on the electronic device, obtaining contextual information of the application, the contextual information including data indicating when the application was installed and frequency of use of the application, obtaining utilization data, the utilization data including data indicating applications that have been installed on the electronic device, determining a plurality of applications that are similar to the first application; generating a first predictive model using the contextual information and the utilization data, the first predictive model being configured to predict a likelihood of uninstallation of an application; and automatically recommending, at the time of uninstallation of the application, one or more of the plurality of applications, the recommending being based at least in part on the first predictive model.

21 Claims, 7 Drawing Sheets

(56) References Cited

U.S. PATENT DOCUMENTS

| | | |
|---|---|---|
| 2005/0246211 A1 | 11/2005 | Kaiser |
| 2007/0150361 A1 | 6/2007 | Kreiner et al. |
| 2008/0059416 A1 | 3/2008 | Forbes et al. |
| 2009/0171680 A1 | 7/2009 | Wiesinger |
| 2011/0320307 A1 | 12/2011 | Mehta |
| 2013/0085886 A1 | 4/2013 | Satish |
| 2013/0145360 A1* | 6/2013 | Ricci ........................ H04W 4/90 717/174 |
| 2013/0198029 A1 | 8/2013 | Mowatt et al. |
| 2013/0304608 A1 | 11/2013 | Mehta et al. |
| 2013/0326499 A1* | 12/2013 | Mowatt ...................... G06F 8/60 717/177 |
| 2013/0339284 A1* | 12/2013 | Rowles .................. G06Q 30/02 706/46 |
| 2014/0237361 A1 | 8/2014 | Martin et al. |
| 2015/0088955 A1 | 3/2015 | Hendrick et al. |
| 2015/0112831 A1* | 4/2015 | Jackson ............. G06Q 30/0631 705/26.7 |
| 2015/0169759 A1 | 6/2015 | Ronen et al. |
| 2015/0346961 A1 | 12/2015 | Cui et al. |
| 2015/0363289 A1 | 12/2015 | Brough |
| 2016/0154641 A1 | 6/2016 | Kirkham |
| 2016/0162270 A1 | 6/2016 | Kumar |
| 2016/0294961 A1 | 10/2016 | Cordes et al. |
| 2017/0351388 A1 | 12/2017 | Grunewald et al. |

OTHER PUBLICATIONS

International Search Report and Written Opinion from International Application No. PCT/US2018/022520, dated Jun. 15, 2018, 16 pp.

Yan et al., "AppJoy: Personalized Mobile Application Discovery", Department of Computer Science, University of Massachusetts Lowell, Jun. 28, 2011, pp. 113-126.

Cheng et al, "Wide & Deep Learning for Recommender Systems", Deep Learning for Recommender Systems, Sep. 15, 2016, 4 pp.

* cited by examiner

270

| Application | Batt. Drain | Performance | Size | Memory | Installed time | Frequency |
|---|---|---|---|---|---|---|
| Veggie Ninja | 1 (low) | 0.011 | 10 (30 mb) | 1 (low) | 50 (1 week) | 3 (occasional) |
| Jetpack Jumper | 1 (low) | 0.013 | 11 (32 mb) | 1 (low) | 10 (4 hours) | 5 (high) |
| Hearthrock | 3 (high) | 0.009 | 200 (1.4 gb) | 3 (high) | 1000 (18 months) | 5 (high) |
| Church Run | 2 (med) | 0.038 | 50 (120 mb) | 2 (med) | 100 (2 weeks) | 3 (occasional) |
| Castle Crush | 2 (med) | 0.041 | 30 (89 mb) | 2 (med) | 1 (15 min) | 4 (often) |
| Linda Craft Go | 3 (high) | 0.017 | 185 (987 mb) | 3 (high) | 1000 (6 months) | 1 (rare) |
| ... | ... | ... | ... | ... | ... | ... |

|  | Min | Max | +/- |
|---|---|---|---|
| Rating | 4 | 4.5 | 0.2 |
| Performance | 0.009 | 0.017 | 0.002 |
| Size | 185 | 200 | 10 |
| Memory | 185 | 200 | 5 |
| Batt. Drain | 3 | 3 | 0 |
| ... | ... | ... | ... |

SYSTEMS AND METHODS FOR GENERATING AND COMMUNICATING APPLICATION RECOMMENDATIONS AT UNINSTALL TIME

BACKGROUND

Many electronic devices include operating systems that can execute applications. As the popularity of applications increases, more and more developers are attracted to create applications for various platforms. Some platforms now have applications numbering in the millions.

BRIEF SUMMARY

According to an embodiment of the disclosed subject matter, a computer-implemented method for generating and communicating an application recommendation includes receiving a signal from an electronic device indicating that an uninstallation of a first application has been initiated by a user on the electronic device, obtaining contextual information of the first application, the contextual information including data that indicates a period of time during which the first application was installed and a frequency of use of the first application, obtaining utilization data, the utilization data including data that indicates other applications that have been installed on the electronic device, determining a plurality of applications that are similar to the first application, generating a first predictive model using at least the contextual information and the utilization data, the first predictive model being configured to predict a likelihood of uninstallation of a second application in the plurality of applications, and automatically recommending, at the time of the uninstallation of the first application, one or more of the plurality of applications, the recommending being based at least in part on the first predictive model.

According to another embodiment of the disclosed subject matter, a computer-implemented method for generating and communicating an application recommendation includes receiving a signal from an electronic device indicating that an uninstallation of a first application has been initiated by a user on the electronic device, obtaining contextual information of the first application, the contextual information including data that indicates when the first application was installed and frequency of use of the first application, obtaining utilization data, the utilization data including data that indicates applications that have been installed on the electronic device, determining a plurality of applications that are similar to the first application, determining a score for the first application, the score being based on the utilization data and indicating a level of the user's satisfaction with the first application, updating a range of values in a user profile based on the score and the contextual information, the range of values indicating a range of contextual information values that the user tolerated in the first application, and automatically recommending, at the time of the uninstallation of the first application, one or more of the plurality of applications, the recommending being based at least in part on the user profile.

According to an embodiment of the disclosed subject matter, means for receiving a signal from an electronic device indicating that an uninstallation of a first application has been initiated by a user on the electronic device, obtaining contextual information of the first application, the contextual information including data that indicates a period of time during which the first application was installed and a frequency of use of the first application, obtaining utilization data, the utilization data including data that indicates other applications that have been installed on the electronic device, determining a plurality of applications that are similar to the first application, generating a first predictive model using at least the contextual information and the utilization data, the first predictive model being configured to predict a likelihood of uninstallation of a second application in the plurality of applications, and automatically recommending, at the time of the uninstallation of the first application, one or more of the plurality of applications, the recommending being based at least in part on the first predictive model, are provided.

According to another embodiment of the disclosed subject matter, means for receiving a signal from an electronic device indicating that an uninstallation of a first application has been initiated by a user on the electronic device, obtaining contextual information of the first application, the contextual information including data that indicates when the first application was installed and frequency of use of the first application, obtaining utilization data, the utilization data including data that indicates applications that have been installed on the electronic device, determining a plurality of applications that are similar to the first application, determining a score for the first application, the score being based on the utilization data and indicating a level of the user's satisfaction with the first application, updating a range of values in a user profile based on the score and the contextual information, the range of values indicating a range of contextual information values that the user tolerated in the first application, and automatically recommending, at the time of the uninstallation of the first application, one or more of the plurality of applications, the recommending being based at least in part on the user profile, are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows example application profiles according to an embodiment of the disclosed subject matter.

FIG. 5 shows an example user profile according to an embodiment of the disclosed subject matter.

DETAILED DESCRIPTION

Figure 1:
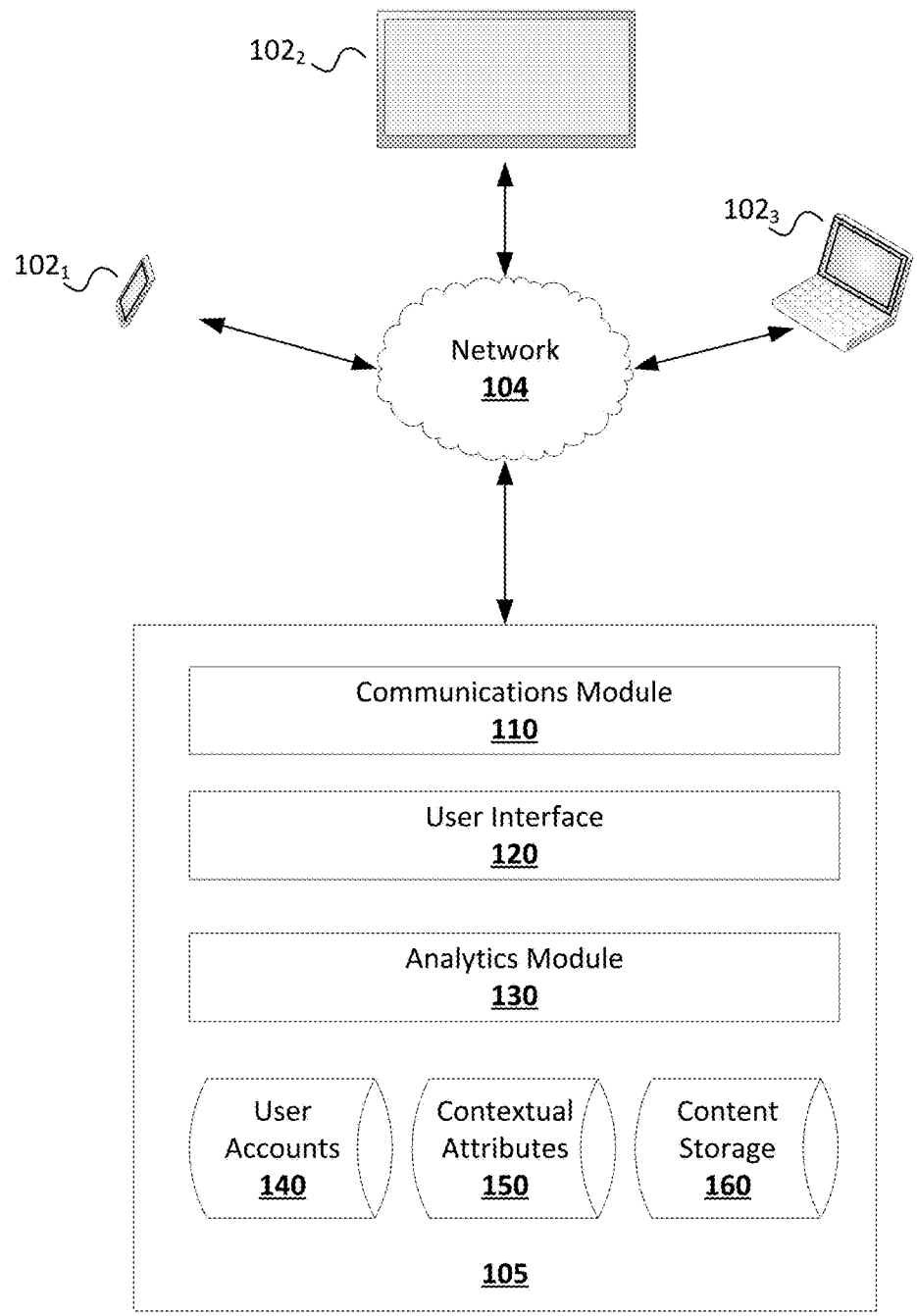
FIG. 1 shows an example system configuration according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Users attempting to navigate crowded application distribution services can find themselves trapped in perpetual rounds of hit-and-miss. Large amounts of time and computing resources are wasted as users try applications only to be frustrated at the results and forced to try another, ad infinitum. The toll of this cycle is extracted from the distribution services system and the network system, taking up bandwidth and slowing down data transfer speeds for all users as well as causing unnecessary wear on the users' electronic devices themselves while degrading the user experience of the device and ecosystem as a whole.

Distribution service systems and associated user devices can function more efficiently if accurate recommendations are provided to the users to guide them toward applications that are more likely to address their concerns. Time, computing resources, and user experience are all valuable factors that are impacted by the quality and timeliness of application recommendations, both of which can be significantly improved by implementing the disclosed embodiments.

Currently, conventional application recommendation systems communicate recommendations to users when they access the distribution service interface, e.g., when a user visits an online app store a splash page shows recommendations. The recommendations are typically based on what the user has installed in the past or based on what other similarly situated users have installed using techniques such as collaborative filtering. However, the user must first access the store to receive the recommendation, which is an additional barrier between the user and the recommendation, and by extension, an additional barrier between the user and discovery of new, useful content. For example, the user, after uninstalling an application that failed to satisfy him/her, may or may not be motivated enough to go back to the app store and continue searching to find replacements for what they uninstalled. Even if the user does return to access the distribution service interface, the distribution service system does not have any indication that the user recently uninstalled an application or any indication of why the user has done so, therefore its recommendation is not focused on the user's immediate concerns.

The disclosed embodiments improve the technological art of automatically discovering and recommending applications to a user of an electronic device. The recommendation process is designed to learn which secondary interests are important to the user and to address the user's immediate concerns. At the time of uninstallation, a system of the disclosed embodiments can obtain contextual information and historical utilization data that can be used to determine a recommendation for one or more applications to replace a deleted application, with an improved likelihood that the recommended applications will satisfy the user's secondary interests.

In some embodiments, contextual information and historical utilization data can be used to determine training data for one or more machine learning algorithms. The algorithms can produce one or more models that can predict which applications will be satisfactory for a given user. Recommendations for applications can then be based at least in part on the one or more models.

The training data can include various inputs as well as the appropriate outputs that have been determined to result from those inputs. For example, historical utilization data can be used to determine a score (output) that indicates a satisfaction level of past/current applications that the user has installed/uninstalled. Contextual information that corresponds to attributes of the applications can be used to provide input. Then, using a supervised machine learning algorithm, models can be inferred from the historical utilization data and contextual information. It should be understood that a person having ordinary skill in the art would recognize various other machine learning approaches that can be utilized consistent with the scope of the present disclosure. For example, the machine learning algorithm can also be used to leverage contextual information and utilization data from multiple users.

FIG. 1 shows an example system configuration 100 that can implement the disclosed embodiments. The system can be configured for use on a wide area network, such as that illustrated in FIG. 1, however, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with distribution service platform 105 through client devices $102_1$, $102_2$, $102_3$, ..., $102_n$ (collectively "102") connected to network 104 by direct and/or indirect communication. Distribution service platform 105 can support connections from a variety of different client devices, such as desktop computers; mobile computers; mobile communications devices, e.g. mobile phones, smart phones, tablets; smart televisions; set-top boxes; wearable electronic devices, and/or any other network enabled computing devices. Client devices 102 can be of varying type, capabilities, operating systems, etc. Furthermore, distribution service platform 105 can concurrently accept connections from and interact with multiple client devices 102.

A user can interact with distribution service platform 105 via a client-side application installed on a client device 102. In some embodiments, the client-side application can include a distribution service platform specific component. For example, the component can be a stand-alone "Store" application, one or more application plug-ins, and/or a browser extension. A user can also view or select applications and/or content via a web interface generated and served by user interface module 120. For example, the user can navigate in a web browser to a web address provided by distribution service platform 105. However, the user can also interact with distribution service platform 105 via a third-party application, such as a web browser, that resides on client device 102 and is configured to communicate with distribution service platform 105. In any case, the client-side application can present a user interface (UI) for the user to interact with distribution service platform 105. For example, the user can interact with the distribution service platform 105 via a client-side application integrated with the file system or via a webpage displayed using a web browser application.

Distribution service platform 105 can make it possible for a user to search, select, purchase, and download applications and various types of content, as well as perform a variety of content management tasks, such as retrieve, modify, browse, and/or share the applications and content. Furthermore, distribution service platform 105 can make it possible for a user to access the content from multiple client devices 102. For example, client device $102_1$ can upload content to distribution service platform 105 via network 104. The content can later be retrieved from distribution service platform 105 using the same client device $102_1$ or some other client device $102_3$.

To facilitate the various content and application management services, a user can create an account with distribution service platform 105. The account information can be maintained in user account database 140. User account database 140 can store profile information for registered users. In some cases, the only personal information in the user profile can be a username and/or email address. However, distribution service platform 105 can also be configured to accept additional user information, as will be discussed further below.

Applications and content can be stored in content storage 160. Content storage 160 can be a storage device, multiple storage devices, or a server. Alternatively, content storage 160 can be a cloud storage provider or network storage accessible via one or more communications networks. Distribution service platform 105 can hide the complexity and details from client devices 102 so that client devices 102 do not need to know exactly where the applications and content items are being stored by distribution service platform 105. Distribution service platform 105 can store the applications and content items, for example, in a network accessible storage (SAN) device, in a redundant array of inexpensive disks (RAID), etc. Content storage 160 can store applications and content items using one or more partition types, such as FAT, FAT32, NTFS, EXT2, EXT3, EXT4, ReiserFS, BTRFS, and so forth.

Content storage 160 can also store metadata describing applications and content items, application and content item types, and the relationships of applications and content items to various user accounts. The metadata for an application or content item can be stored as part of the application or content item, or can be stored separately. In one variation, each application and content item stored in content storage 160 can be assigned a system-wide unique identifier.

Distribution service platform 105 can include a communications module 110 for communicating with various client devices 102 via the network 104. Conversely, certain software applications on client devices 102 can communicate with the distribution service platform 105 via an Application Programming Interface (API) on behalf of a user. For example, a software package, such as an application running on a smartphone or tablet computing device, can programmatically transmit requests directly to distribution service platform 105, when a user provides credentials, to download an application from content storage 160. Similarly, the API can allow users to browse or access all or part of content storage 160 through a web site.

Distribution service platform 105 can also include an analytics module 130 that can track and report on aggregate file operations, user actions, network usage, total storage space used, as well as other technology, usage, or business metrics. The analytics module 130 can also track downloads of applications and maintain a contextual attributes database 150 that associates application profiles with reported contextual attributes of the applications, as will be discussed further below. A privacy and/or security policy can prevent unauthorized access to user data stored with distribution service platform 105.

While distribution service platform 105 is presented with specific components, it should be understood by one skilled in the art, that the architectural configuration of system 105 is simply one possible configuration and that other configurations with more or less components are also possible.

Figure 2A:
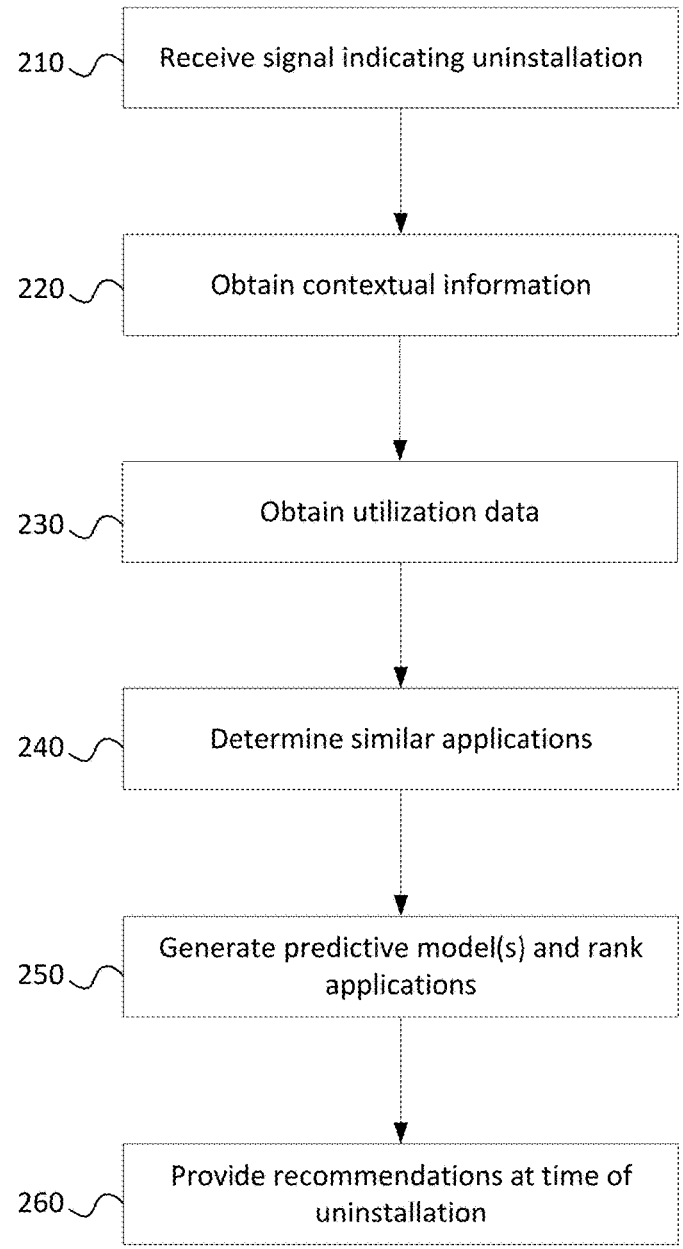
FIG. 2A shows an example recommendation process according to an embodiment of the disclosed subject matter.

FIG. 2A shows an example embodiment of a recommendation process 200 according to the disclosed subject matter. Briefly, when an application is uninstalled the process 200 uses "contextual attributes" that characterize the application and "utilization data" that capture the user's historical application usage to predict which applications that are similar to the uninstalled application will be satisfactory to the user and presents a recommendation accordingly at the time of uninstallation. Further details follow.

At operation 210 a recommendation system receives a signal from an electronic device (e.g., $102_1$ in FIG. 1) that indicates a user has initiated uninstallation of an application on the electronic device. In one embodiment the recommendation system can reside on an external server (e.g., distribution service platform 105 in FIG. 1). In another embodiment, the recommendation system can reside on the electronic device itself.

At operation 220 the recommendation system obtains contextual information related to the application. The contextual information provides details of how the application was used and performed. In one embodiment the contextual information can include data that indicates when the application was installed, how frequently it was used, and how much storage space it occupied.

In some embodiments an API can be provided for the application and/or the operating system of the electronic device to store and transmit more detailed contextual information to the recommendation system. For example, the API can include one or more functions that store data related to performance of the application. Such performance data can include, for example, data values that represent: battery energy consumption, how much network data the application downloaded/uploaded, how much memory the application used, how often the application failed or "crashed," display metrics such as how often the application "stuttered" or "froze", how fast the application loaded, etc. Other types of performance and/or quality related data not listed here can be stored, e.g., an application's review rating in a distribution service platform. Such data will be referred to herein as "contextual attributes" of an application. In some electronic device systems one or more of types of contextual attributes may or may not available, depending on the settings and capabilities of the application and the electronic device operating system.

In some embodiments the electronic device (e.g., $102_1$ in FIG. 1) can be configured to transmit an application's contextual information to the distribution services platform (e.g., 105 in FIG. 1) when an application is uninstalled on the electronic device. The distribution services platform can store the contextual information in a database (e.g., 150 in FIG. 1) in association with a profile corresponding to the application. The profile can be maintained cumulatively. For example, a profile for a hypothetical application "Radical Racer" can include data indicating that based on data received from 1000 uninstalls on client devices (e.g., 102 in FIG. 1), on average the application crashed 1 time per 50 startups. In this example, a "crash_rating" contextual attribute can be a part of the application profile to store this data.

At operation 230 the system obtains what will be referred to as "utilization data" associated with the user of the electronic device. The utilization data can include information that identifies applications that have been installed/uninstalled on the electronic device and the timing of the installations/uninstallations. As will be seen, utilization data can provide a basis for determining which context attributes are secondary interests that are important to the user and thereby impact predictions of which applications are likely to succeed in satisfying the user.

At operation 240 the system determines a plurality of applications that are similar to the application being uninstalled. One application is "similar to" another if it is determined that it can provide at least one equivalent, replacement, or essentially equivalent function that may be sufficient to replace the functionality of the other application for a user. For example, techniques disclosed herein may determine that one application is similar to another based on known techniques and algorithms to determine applications similar to a target application in a distribution service platform. For example, similarity can be determined based on an application's metadata that identify keywords, type, genre, developer, etc., that classify, categorize, or describe the application.

Theoretically, the user may have a primary interest in replacing the uninstalled application with a similar application that better satisfies the user's secondary interests. However, in highly populated distribution service platforms, simply recommending similar applications, as many conventional recommendation systems do, often falls short of sufficiently narrowing the application field. That is, while a distribution service may have dozens or even hundreds of a certain type of application, e.g., racing games, the applications can vary in implementation such that some will satisfy a given user and others will not satisfy the same user. Merely recommending similar applications, or even recommending the highest rated similar applications, can fail to connect a given user to the application that will appeal most to that user's specific secondary interests.

At operation 250 the disclosed recommendation system generates one or more models based on the user's contextual information and utilization data to predict which application among similar applications will satisfy a user by learning which contextual attributes are important secondary interests for the user. The similar applications can then be ranked based on the secondary interests to increase the likelihood of recommending applications that will satisfy the user's search.

At operation 260 a recommendation, based on the ranked similar applications, is provided to the user at the time of uninstallation. A reason for making the recommendation can also be provided, based on the contextual attributes of the uninstalled application.

Figure 2B:
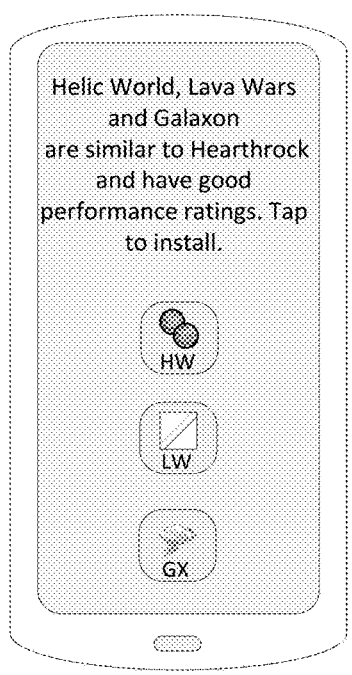
FIG. 2B shows an example recommendation screen according to an embodiment of the disclosed subject matter.

FIG. 2B shows an example recommendation screen 270, in which three applications are presented. The screen 270 can be displayed while the uninstallation is taking place or immediately preceding thereafter. In this manner the barrier of requiring the user to access the distribution service is eliminated. A frustrated user who is dissatisfied with an application may not be inclined to go back to the distribution service interface to start searching again, however, the user may be willing to give another application a try upon seeing a direct, automatic presentation of what appears to be a good recommendation. The removal of the access barrier and the timeliness of the recommendation are significant improvements over the conventional method of recommending applications through a distribution service interface splash page or the like. In the disclosed embodiments, the user does not need to navigate back to the distribution service, navigate through its interface back to its search function and resume sifting through search results to figure out where he/she left off. Instead, the user can be immediately presented with a plurality of application recommendations that are tailored specifically to address the user's primary and secondary interests. As shown in FIG. 2B, the electronic device can be configured such that the user need only tap a button or enter a single input to initiate a purchase or a download/installation of a recommended application.

As described above, contextual information can be captured in specific contextual attributes and stored in application profiles. FIG. 3 shows an example table of profiles for a user's electronic device comprising applications 310, associated contextual attributes 320, and utilization data 330. In this example, four contextual attributes are shown, however, more or less and different types of contextual attributes can be used.

Contextual attributes can be represented in a normalized numerical format. For example, the "Battery Drain" attribute in this example is represented on a scale of 1 to 3, with "1" indicating low drain, "2" indicating medium drain, and "3" indicating high drain. In another example, the "Performance" attribute is represented in a direct value, for example, calculated by dividing the number of crashes by the number of instances of execution. In another example, the "Size" attribute normalizes the memory range of 0 to 1 gb to a value in the range of 0 to 200 where, any memory size over 1 gb normalizes to a value of 200. Each of these formats are merely examples. One of ordinary skill in the art would recognize that contextual attributes can be represented in any of the above or other formats or using different normalization techniques as appropriate for the data set.

The contextual attributes set can further include values associated with the application obtained from other sources, such as the application's rating in the distribution platform.

The utilization data can also be normalized. For example, in FIG. 3 "Installed Time" is a time range of 0 to 6 months normalized to a range of 0 to 1000, where any value over 6 months normalizes to a value of 1000. The utilization data 330 can be used to generate an application satisfaction score S for the user. For example, the satisfaction score S can be defined as simple as the normalized time value that the application remained installed, or can be defined by a formula that incorporates the normalized time value and the frequency value into a single representative score value (e.g., S=NT×F) that represents how satisfied the user is with the application based on the utilization data.

The satisfaction score, utilization data and contextual attributes can be used in multiple ways to improve the accuracy of a recommendation. In one embodiment, the contextual attributes and the satisfaction scores corresponding to the applications represented in the utilization data can form a training data set for one or more machine learning algorithms. For example, a matrix of rows and columns including the full list of applications in a first column and their corresponding contextual attributes in matrix rows can be divided into multiple datasets for training and validation. For example, in one embodiment 70% of the rows can be used for training and 30% of the rows can be used for validation. Multiple machine learning algorithms (e.g., k-nearest neighbors, logistic regression, classification and regression trees, linear discriminant analysis, Gaussian naive Bayes, support vector machines, etc.) can be used on the training data set to build models that can predict satisfaction scores from contextual attributes. Whichever algorithm produces the most accurate model, as tested on the validation data set, can be used on the plurality of applications that are similar to the application being uninstalled.

In one embodiment, the algorithms can be tested on different combinations of attributes and/or on one or more individual attributes at a time to check whether models with increased accuracy can be created. That is, the first column (i.e., the applications) and one or more additional columns can be selected from the matrix training dataset to reduce the matrix to a subset instead of testing the full training dataset. In a simplified scenario, for a first hypothetical user the crash rate of an application is the most important secondary interest. After an application crashes a number of times the first user uninstalls the application, regardless of any other factors. In this case, a direct correlation may exist between the crash rate and satisfaction score of any application that the first user installs. However, for a second hypothetical user load time is the most important secondary interest. For still a third hypothetical user a combination of battery drain and size is most important secondary interests. By applying the algorithms to different combinations of attributes the system can increase the chance of creating a functioning, accurate model.

After a model has been selected, the relevant contextual attributes associated with the profiles of the similar applications can be run through the model to obtain a predicted satisfaction score.

In one embodiment, the most accurate model will only be used if its results achieve at least a minimum threshold of accuracy. The threshold of accuracy can change over time as the system obtains larger data sets of information. For example, the threshold of accuracy can initially be set to 50% and increase an incremental amount per every additional record that is added to the data set, or increase to higher percentages at milestones in the dataset. If none of the models result in at least the minimum threshold of accuracy, a different method can be used to choose which of the similar applications should be recommended to the user.

Figure 4:
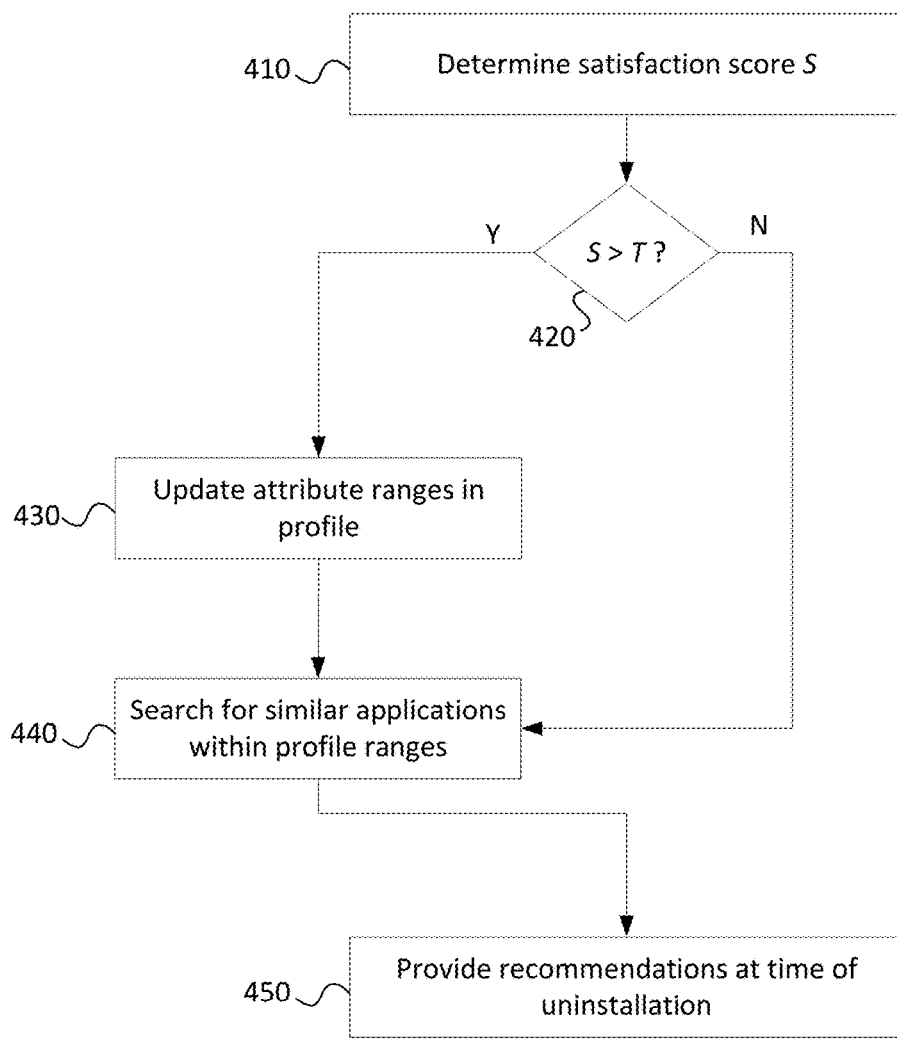
FIG. 4 shows an example selection method according to an embodiment of the disclosed subject matter.

FIG. 4 shows an example selection method that can be used instead of using a prediction model. In this method, the system can build a user profile to determine filter ranges to apply to one or more contextual attributes based on the satisfaction score of the application being uninstalled.

At operation 410 the system determines a satisfaction score S for the application being uninstalled. For example, if the user is uninstalling "Hearthrock" (FIG. 3), the system can determine a satisfaction score S as the (normalized time value)×(frequency value): S=1000×5=5000.

At operation 420 the system determines whether the satisfaction score for the application being uninstalled is above a threshold value T. The satisfaction threshold value can be set to an initial default value and adjusted over time, for example, based on the user's uninstallation patterns and the maximum amounts of time that applications remain installed on the electronic device. Generally, uninstallation of an application with a satisfaction score above the threshold can be viewed as an indication that the user has exhausted the usefulness of the application but would be satisfied to find a similar application with similar contextual attribute values to replace it. Continuing the above example uninstallation of "Hearthrock," if T=1000, then S>T for "Hearthrock."

At operation 430 the system can create filter ranges for contextual attributes based on the values obtained from the uninstalled application. For example, regarding the uninstallation of "Hearthrock" it is reasonable to assume that the user can at least tolerate an application with matching or similar contextual attribute values to Hearthrock. That is, the values of Hearthrock's contextual attributes do not appear to be deal-breakers for the user in view of the relatively high satisfaction score.

At operation 430 the system can store the contextual attributes as part of an update to a user profile. The user profile defines acceptable ranges for contextual attribute values for a given user. For example, based on the S value for "Hearthrock" being greater than threshold T, a range can be defined for each available contextual attribute, for example, by a +/− amount, e.g., 3%, or a default amount defined per attribute that can be fine-tuned to match the user's tolerance over time.

The profile ranges can be further fine-tuned by information obtained during subsequent uninstallations of other applications. FIG. 5 shows an example user profile 500. A profile 500 may initially be created with default values that represent an estimate of user tolerance. The default values can be replaced in updates with information obtained when the user uninstalls an application. In this profile, the user has uninstalled the two games "Hearthrock" and "Linda Craft Go" (FIG. 3). Since both of these games achieved satisfaction scores S above the threshold T=1000, the ranges stored in profile 500 are adjusted to define a minimum and maximum range of contextual attributes that will capture the values of both games.

Accordingly, at operation 440 the system can search for similar applications that have contextual attributes that fall within the ranges defined in the user profile. At operation 450 the recommendation can be provided to the user at the time of uninstallation.

The disclosed embodiments can therefore provide recommendations that use data captured at the time of uninstallation of an application to more accurately consider why a user is uninstalling the application (e.g., whether the user is satisfied or not with the application) and not simply recommend similar applications, but predict which similar applications are likely to satisfy the user's current desire and immediately provide a recommendation directly to the user at the time of uninstallation, thereby removing a significant barrier between the user and the applications.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 6:
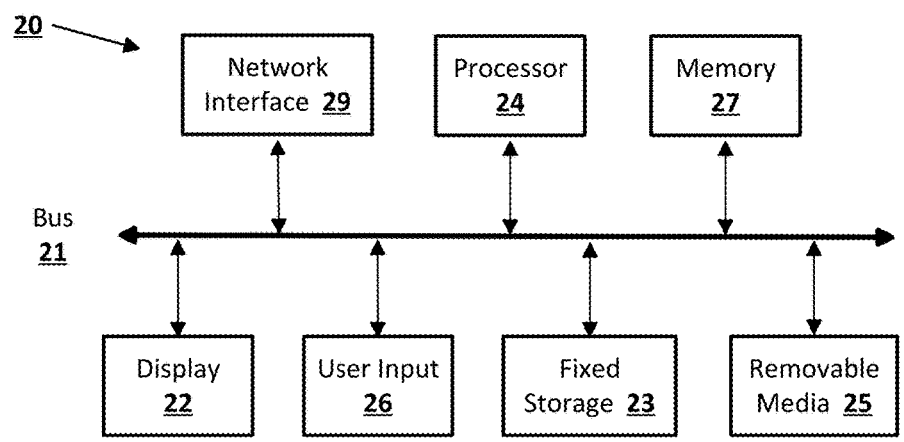
FIG. 6 shows a computing device according to an embodiment of the disclosed subject matter.

Embodiments of the presently disclosed subject matter may be implemented in and used with a variety of component and network architectures. FIG. 6 is an example electronic device 20 (e.g., $102_1$ in FIG. 1) suitable for implementing embodiments of the presently disclosed subject matter. The device 20 may be, for example, a television, a desktop or laptop computer, or a mobile computing device such as a smart phone, tablet, or the like. The device 20 can include a bus 21 which interconnects major components, such as a central processor 24, a memory 27 such as Random Access Memory (RAM), Read Only Memory (ROM), flash RAM, or the like, a user display 22 such as a display screen, a user input interface 26, which can include one or more controllers and associated user input devices such as a button, spin wheel, slider, keyboard, mouse, touch screen, or the like, a fixed storage 23 such as a hard drive, flash storage, etc., an optional removable media component 25 operative to control and receive an memory card, optical disk, flash drive, or the like, an optional network interface 29 operable to communicate with one or more external devices via a suitable network connection, and a transceiver 30 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 20 are generally stored on and accessed via a computer readable medium, such as a solid state storage drive (e.g., fixed storage 23), a hard drive, flash drive, optical drive, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., digital cameras, speakers, microphones, scanners, etc.). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
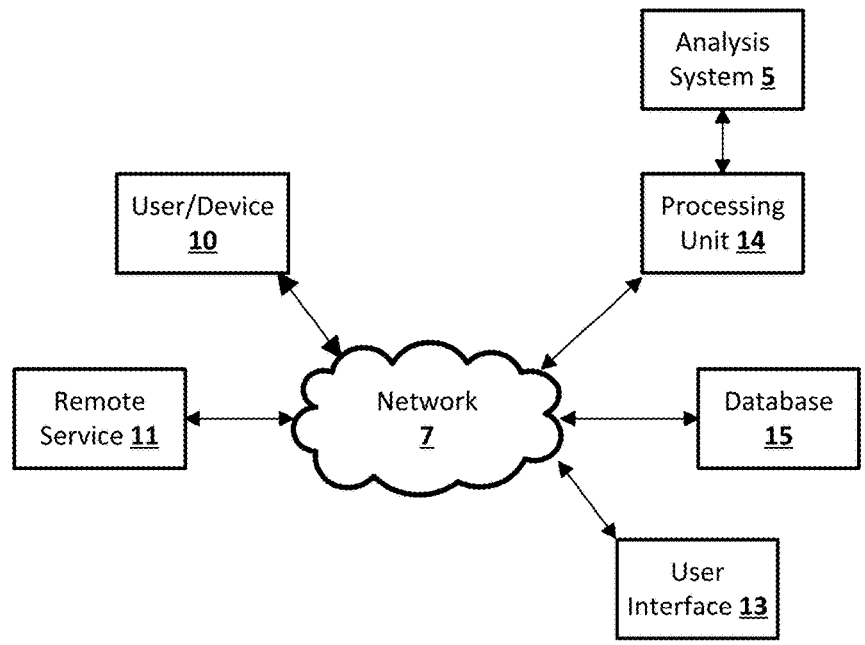
FIG. 7 shows a network configuration according to an embodiment of the disclosed subject matter.

FIG. 7 shows another example arrangement according to an embodiment of the disclosed subject matter. One or more electronic devices or systems 10, 11, such as remote services or service providers 11, user devices 10 such as local computers, smart phones, tablet computing devices, televisions, wearable electronic devices and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a application/content database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as memory cards, flash drives, floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for generating and communicating an application recommendation, comprising:
   receiving a signal from an electronic device indicating that an uninstallation of an application has been initiated by a user of the electronic device;
   obtaining contextual attribute information of the application, the contextual attribute information including data that indicates a period of time during which the application was installed and performance data of the application, the performance data including one or more of battery energy consumption, network data utilization, memory utilization, crash frequency, display metrics, or application load time metrics;
   obtaining utilization data, the utilization data including data that indicates other applications that have been installed on the electronic device and historical usage of the other applications by the user;
   determining, based at least in part of functionality provided by the application and respective functionality provided by a plurality of other applications, a portion of the plurality of applications as a plurality of similar application;
   generating a predictive model using at least the contextual attribute information and the utilization data;
   determining a respective predicted satisfaction score for each of the plurality of similar applications by at least applying the predictive model to the plurality of similar applications, wherein the predicted score represents a normalized value that a corresponding application will remain installed should the application be installed at the electronic device;
   identifying one or more of the plurality of similar applications as having the respective predicted satisfaction score greater than a threshold satisfaction score as one or more recommend applications;
   after receiving the signal indicating that the uninstallation of the application has been initiated, sending, to the electronic device, information about the one or more recommended applications as the application recommendation;
   receiving, from the electronic device, a selection of one of the one or more recommended applications as an application to install; and
   initiating installation of the application to install at the electronic device.

2. The method of claim 1, wherein the utilization data further includes data that indicates, respectively, for each of the other applications respectively, one or more of: an installation time or an uninstallation time.

3. The method of claim 1, wherein the plurality of applications is stored in a distribution service platform and is determined based on metadata associated with the first application and metadata associated with the plurality of applications.

4. The method of claim 1, wherein sending the information about the one or more recommended applications further comprises: causing a notification to be output on a display of the electronic device, the notification including one or more respective icons corresponding to the one or more recommended applications, wherein the electronic device is configured to initiate a purchase or download of the corresponding application when the respective icon is selected.

5. The method of claim 1, wherein generating the predictive model comprises:
   determining a dataset comprising a matrix of one or more applications from the plurality of other applications, respective contextual attribute information for the one or more applications from the plurality of other applications, and respective utilization data information for the one or more applications from the plurality of other applications;
   generating, based on the respective utilization data for each of the one or more applications from the plurality of other applications, respective satisfaction scores for each of the one or more application from the plurality of other applications, the respective satisfaction scores indicating a level of the user's satisfaction with each of the one or more applications from the plurality of other applications;
   dividing the dataset into at least one training dataset and at least one validation dataset; and
   evaluating two or more machine learning algorithms on the training dataset and the validation dataset to determine an algorithm that produces the predictive model that predicts a target application's score based on the target application's corresponding contextual data.

6. The method of claim 5, wherein the two or more machine learning algorithms are selected from the group consisting of: k-nearest neighbors, logistic regression, classification and regression trees, linear discriminant analysis, Gaussian naive Bayes and support vector machines.

7. The method of claim 5, wherein evaluating the two or more machine learning algorithms comprises:
   applying the two or more algorithms to a first subset of the training dataset;
   applying the two or more algorithms to a second subset of training dataset different from the first subset; and
   selecting the algorithm and subset that produces the most accurate results against the validation dataset.

8. A system comprising:
   a processor; and
   a computer readable medium that stores computer readable instructions that, when executed by the processor, are effective to cause the system to:
      receive a signal from an electronic device, the signal indicating that an uninstallation of an application has been initiated by a user of the electronic device;
      obtain contextual attribute information of the application, the contextual attribute information including data that indicates a period of time during which the application was installed and performance data of the application, the performance data including one or more of battery energy consumption, network data utilization, memory utilization, crash frequency, display metrics, or application load time metrics;

obtain utilization data, the utilization data including data that indicates other applications that have been installed on the electronic device and historical usage of the other applications by the user;

determine, based at least in part of functionality provided by the application and respective functionality provided by a plurality of other applications, a portion of the plurality of applications as a plurality of similar application;

generate a predictive model using at least the contextual attribute information and the utilization data;

determine a respective predicted satisfaction score for each of the plurality of similar applications by at least applying the predictive model to the plurality of similar applications, wherein the predicted score represents a normalized value that a corresponding application will remain installed should the application be installed at the electronic device;

identify one or more of the plurality of similar applications as having the respective predicted satisfaction score greater than a threshold satisfaction score as one or more recommend applications;

after receiving the signal indicating that the uninstallation of the application has been initiated, send, to the electronic device, information about the one or more recommended applications as the application recommendation;

receive, from the electronic device, a selection of one of the one or more recommended applications as an application to install; and initiate installation of the application to install at the electronic device.

9. The system of claim 8, wherein the utilization data further includes data that indicates, for each of the other applications respectively, one or more of: an installation time or an uninstallation time.

10. The system of claim 8, wherein the plurality of applications is stored in a distribution service platform and is determined based on metadata associated with the first application and metadata associated with the plurality of applications.

11. The system of claim 8, wherein the computer readable instructions that cause the system to send the information about the one or more recommended applications further causes the electronic device to display a notification on a display of the electronic device, the notification including one or more respective icons corresponding to the one or more recommended applications.

12. The system of claim 8, wherein the computer readable instructions that cause the system to generate the predictive model causes the system to:

determine a dataset comprising a matrix of one or more applications from the plurality of other applications, respective contextual attribute information for the one or more applications from the plurality of other applications, and respective utilization data information for the one or more applications from the plurality of other applications;

generate, based on the respective utilization data for each of the one or more applications from the plurality of other applications, respective satisfaction scores for each of the one or more application from the plurality of other applications, the respective satisfaction scores indicating a level of the user's satisfaction with each of the one or more applications from the plurality of other applications;

divide the dataset into at least one training dataset and at least one validation dataset; and evaluate two or more machine learning algorithms on the training dataset and the validation dataset to determine an algorithm that produces the predictive model that predicts a target application's score based on the target application's corresponding contextual data.

13. The system of claim 12, wherein the two or more machine learning algorithms are selected from the group consisting of: k-nearest neighbors, logistic regression, classification and regression trees, linear discriminant analysis, Gaussian naive Bayes and support vector machines.

14. The system of claim 12, wherein the computer readable instructions that cause the system to evaluate the two or more machine learning algorithms cause the system to:

apply the two or more algorithms to a first subset of the training dataset;

apply the two or more algorithms to a second subset of training dataset different from the first subset; and select the algorithm and subset that produces the most accurate results against the validation dataset.

15. A non-transitory computer-readable storage medium encoded with instructions that, when executed, cause one or more processors to:

receive a signal from an electronic device, the signal indicating that an uninstallation of an application has been initiated by a user of the electronic device;

obtain contextual attribute information of the application, the contextual attribute information including data that indicates a period of time during which the application was installed and performance data of the application, the performance data including one or more of battery energy consumption, network data utilization, memory utilization, crash frequency, display metrics, or application load time metrics;

obtain utilization data, the utilization data including data that indicates other applications that have been installed on the electronic device and historical usage of the other applications by the user;

determine, based at least in part of functionality provided by the application and respective functionality provided by a plurality of other applications, a portion of the plurality of applications as a plurality of similar application;

generate a predictive model using at least the contextual attribute information and the utilization data;

determine a respective predicted satisfaction score for each of the plurality of similar applications by at least applying the predictive model to the plurality of similar applications, wherein the predicted score represents a normalized value that a corresponding application will remain installed should the application be installed at the electronic device;

identify one or more of the plurality of similar applications as having the respective predicted satisfaction score greater than a threshold satisfaction score as one or more recommend applications;

after receiving the signal indicating that the uninstallation of the application has been initiated, send, to the electronic device, information about the one or more recommended applications as the application recommendation;

receive, from the electronic device, a selection of one of the one or more recommended applications as an application to install; and initiate installation of the application to install at the electronic device.

16. The non-transitory computer-readable storage medium of claim 15, wherein the utilization data further includes data that indicates, for the other applications respectively, one or more of: an installation time, or an uninstallation time.

17. The non-transitory computer-readable storage medium of claim 15, wherein the plurality of applications is stored in a distribution service platform and are determined based on metadata associated with the first application and metadata associated with the plurality of applications.

18. The non-transitory computer-readable storage medium of claim 15, wherein the computer readable instructions that cause the one or more processors to send the information about the one or more recommended applications further causes the electronic device to display a notification on a display of the electronic device, the notification including one or more respective icons corresponding to the one or more recommended applications.

19. The non-transitory computer-readable storage medium of claim 15, wherein the computer readable instructions that cause the one or more processors to generate the predictive model causes the one or more processors to:
- determine a dataset comprising a matrix of one or more applications from the plurality of other applications, respective contextual attribute information for the one or more applications from the plurality of other applications, and respective utilization data information for the one or more applications from the plurality of other applications;
- generate, based on the respective utilization data for each of the one or more applications from the plurality of other applications, respective satisfaction scores for each of the one or more application from the plurality of other applications, the respective satisfaction scores indicating a level of the user's satisfaction with each of the one or more applications from the plurality of other applications;
- divide the dataset into at least one training dataset and at least one validation dataset; and
- evaluate two or more machine learning algorithms on the training dataset and the validation dataset to determine an algorithm that produces the predictive model that predicts a target application's score based on the target application's corresponding contextual data.

20. The non-transitory computer-readable storage medium of claim 19, wherein the two or more machine learning algorithms are selected from the group consisting of: k-nearest neighbors, logistic regression, classification and regression trees, linear discriminant analysis, Gaussian naive Bayes and support vector machines.

21. The non-transitory computer-readable storage medium of claim 19, wherein the computer readable instructions that cause the system to evaluate the two or more machine learning algorithms cause the system to:
- apply the two or more algorithms to a first subset of the training dataset;
- apply the two or more algorithms to a second subset of training dataset different from the first subset; and
- select the algorithm and subset that produces the most accurate results against the validation dataset.

* * * * *